US011930217B2

(12) United States Patent
Choi et al.

(10) Patent No.: US 11,930,217 B2
(45) Date of Patent: *Mar. 12, 2024

(54) METHOD FOR PADDING PROCESSING WITH SUB-REGION PARTITIONS IN VIDEO STREAM

(71) Applicant: TENCENT AMERICA LLC, Palo Alto, CA (US)

(72) Inventors: Byeongdoo Choi, Palo Alto, CA (US); Stephan Wenger, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/828,833

(22) Filed: May 31, 2022

(65) Prior Publication Data

US 2022/0329867 A1 Oct. 13, 2022

Related U.S. Application Data

(63) Continuation of application No. 17/019,692, filed on Sep. 14, 2020, now Pat. No. 11,375,238.

(Continued)

(51) Int. Cl.
*H04N 19/46* (2014.01)
*H04N 19/105* (2014.01)
(Continued)

(52) U.S. Cl.
CPC .......... *H04N 19/70* (2014.11); *H04N 19/105* (2014.11); *H04N 19/132* (2014.11);
(Continued)

(58) Field of Classification Search
CPC .. H04N 19/105; H04N 19/117; H04N 19/132; H04N 19/172; H04N 19/174;
(Continued)

(56) References Cited

U.S. PATENT DOCUMENTS

2017/0085917 A1* 3/2017 Hannuksela ......... H04N 19/136
2018/0376126 A1* 12/2018 Hannuksela ......... H04N 13/161
(Continued)

FOREIGN PATENT DOCUMENTS

JP 2016-521070 A 7/2016
JP 2022-500914 A 1/2022
(Continued)

OTHER PUBLICATIONS

International Search Report dated Dec. 22, 2020 in Application No. PCT/US2020/051192.

(Continued)

*Primary Examiner* — Anner N Holder
(74) *Attorney, Agent, or Firm* — Sughrue Mion, PLLC

(57) ABSTRACT

A method, computer program, and computer system is provided for video coding. The method may include decoding coded syntax elements corresponding to a wrap-around padding process based on shifting a reference block by a width value that is determined based on luma samples in the reference block; and reconstructing at least one coded current picture using the wrap-around padding process, wherein the wrap-around padding process is applied at boundaries of subpictures.

20 Claims, 11 Drawing Sheets

Related U.S. Application Data

(60) Provisional application No. 62/903,635, filed on Sep. 20, 2019.

(51) Int. Cl.
  *H04N 19/132* (2014.01)
  *H04N 19/172* (2014.01)
  *H04N 19/186* (2014.01)
  *H04N 19/513* (2014.01)
  *H04N 19/70* (2014.01)
  *H04N 19/80* (2014.01)

(52) U.S. Cl.
  CPC ......... *H04N 19/172* (2014.11); *H04N 19/186* (2014.11); *H04N 19/46* (2014.11); *H04N 19/513* (2014.11); *H04N 19/80* (2014.11)

(58) Field of Classification Search
  CPC .... H04N 19/176; H04N 19/186; H04N 19/46; H04N 19/513; H04N 19/523; H04N 19/563; H04N 19/59; H04N 19/597; H04N 19/70; H04N 19/80
  See application file for complete search history.

(56) References Cited

U.S. PATENT DOCUMENTS

| | | | |
|---|---|---|---|
| 2019/0082184 A1 | 3/2019 | Hannuksela | |
| 2019/0110076 A1 | 4/2019 | Lim et al. | |
| 2020/0336762 A1 | 10/2020 | Lee et al. | |
| 2021/0092447 A1 | 3/2021 | Choi | |

FOREIGN PATENT DOCUMENTS

| | | |
|---|---|---|
| KR | 10-2016-0034998 A | 3/2016 |
| KR | 10-2019-0080805 A | 7/2019 |
| WO | 2015/011339 A1 | 1/2015 |
| WO | 2020/056247 A1 | 3/2020 |

OTHER PUBLICATIONS

Written Opinion of the International Searching Authority dated Dec. 22, 2020 in Application No. PCT/US2020/051192.
Office Action dated Sep. 13, 2022 in Japanese Application No. 2021-549513.
Philippe Hanhart et al., "CE13 PERP with horizontal geometry padding of reference pictures (Test 3.3)", Joint Video Experts Team (JVET) of ITU-T SG 16 WP 3 and ISO/IEC JTC 1/SC 29/WG 11, JVET-L0231-r2, 12th Meeting, Macau, CN, Oct. 3-12, 2018, pp. 1-8 (15 pages total).
Philippe Hanhart et al., "AHG8: Geometry padding for PERP", Joint Video Experts Team (JVET) of ITU-T SG 16 WP 3 and ISO/IEC JTC 1/SC 29/WG 11, JVET-J0044, 10th Meeting, San Diego, US, Apr. 10-20, 2018, pp. 1-5 (12 pages total).
Korean Office Action dated May 16, 2023 in Korean Application No. 10-2021-7027148.
Philippe Hanhart et al., "CE13: PERP with horizontal geometry padding of reference pictures (Test 3.3)"Joint Video Experts Team (JVET) of ITU-T SG 16 WP 3 and ISO/IEC JTC 1/SC 29/ WG 11, JVET-L0231-r2, 12th Meeting, Macau, CN, Oct. 3-12, 2018, pp. 1-8 (8 pages total).
Extended European Search Report dated Aug. 7, 2023 in European Application No. 20865222.2.
Jianle Chen et al., "AHG12: Treating tile and tile group boundaries as picture boundaries", Joint Video Experts Team (JVET) of ITU-T SG 16 WP 3 and ISO/IEC JTC 1/SC 29/WG 11, JVET-M0136-v1, Jan. 9-18, 2019, 13th Meeting, Marrakech, MA (7 pages).

* cited by examiner

| nal_unit( NumBytesInNALunit ) { | C | Descriptor |
|---|---|---|
| forbidden_zero_bit | All | f(1) |
| nal_ref_idc | All | u(2) |
| nal_unit_type | All | u(5) |
| ... | | |
| } | | |

102

| nal_unit_header( ) { | Descriptor |
|---|---|
| forbidden_zero_bit | f(1) |
| nal_unit_type | u(6) |
| nuh_layer_id | u(6) |
| nuh_temporal_id_plus1 | u(3) |
| } | |

FIG. 3 Streaming System 300

Fig. 6

| | Descriptor |
|---|---|
| seq_parameter_set_rbsp( ) { | |
| ... | |
| sps_ref_wraparound_enabled_flag | u(1) |
| if( sps_ref_wraparound_enabled_flag ) | |
| ref_wraparound_offset | ue(v) |
| ... | |
| } | |

601 — seq_parameter_set_rbsp( ) {
602 — sps_ref_wraparound_enabled_flag
603 — ref_wraparound_offset

FIG. 7

| | Descriptor |
|---|---|
| seq_parameter_set_rbsp( ) { | |
| ... | |
| sps_ref_wraparound_enabled_flag | u(1) |
| if( sps_ref_wraparound_enabled_flag ) | |
| { | |
| left_wraparound_padding_width | ue(v) |
| right_wraparound_padding_width | ue(v) |
| } | |
| ... | |
| } | |

701 — seq_parameter_set_rbsp( ) {
702 — sps_ref_wraparound_enabled_flag
703 — left_wraparound_padding_width
704 — right_wraparound_padding_width

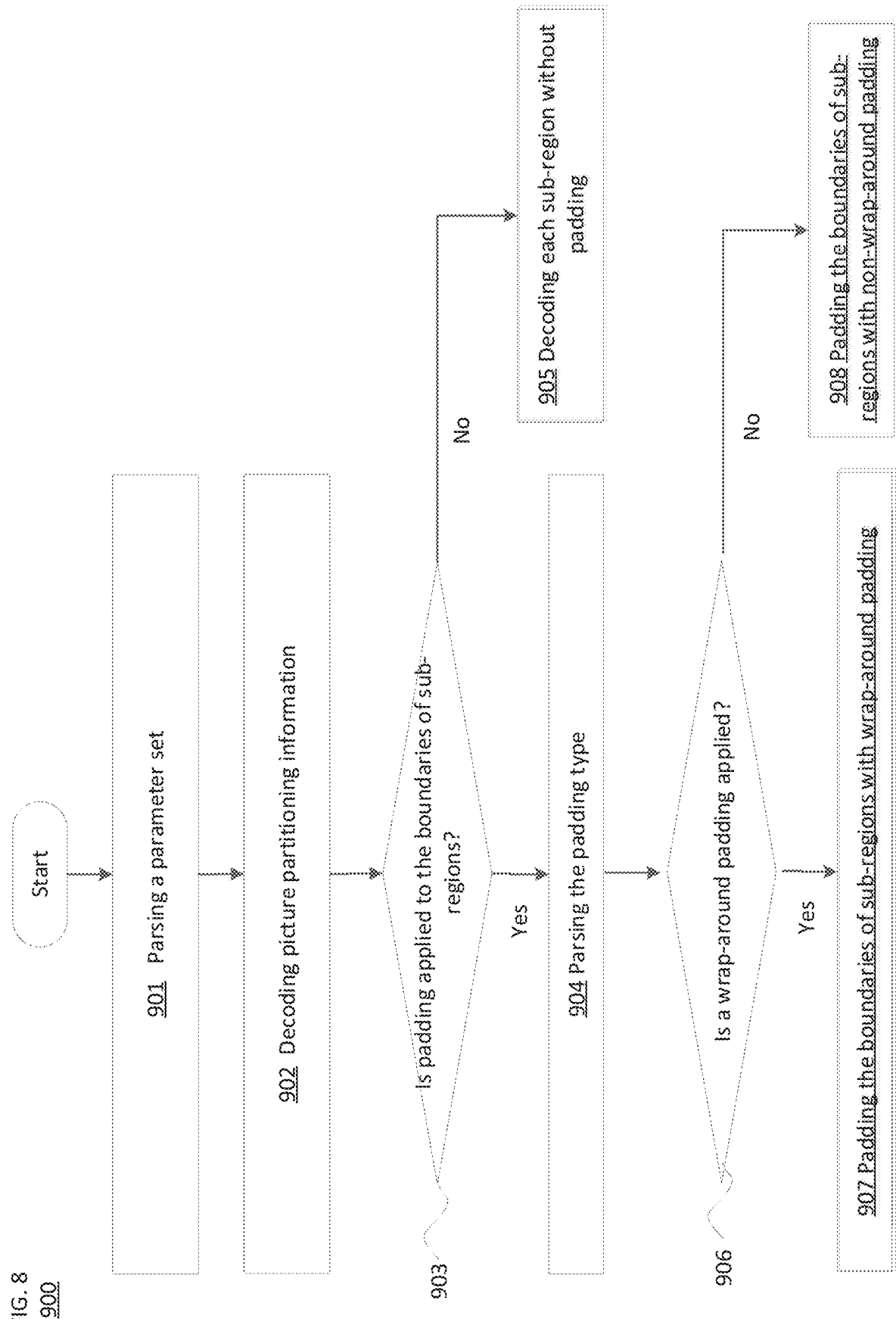

FIG. 9

| seq_parameter_set_rbsp( ) { | Descriptor |
|---|---|
| ... | |
| sps_ref_wraparound_enabled_flag | u(1) |
| if( sps_ref_wraparound_enabled_flag ) | |
| sps_ref_wraparound_offset_minus1 | ue(v) |
| subpics_present_flag | u(1) |
| if( subpics_present_flag ) { | |
| max_subpics_minus1 | u(8) |
| subpic_grid_col_width_minus1 | u(v) |
| subpic_grid_row_height_minus1 | u(v) |
| for( i = 0; i < NumSubPicGridRows; i++ ) | |
| for( j = 0; j < NumSubPicGridCols; j++ ) | |
| subpic_grid_idx[ i ][ j ] | u(v) |
| for( i = 0; i <= NumSubPics; i++ ) { | |
| subpic_treated_as_pic_flag[ i ] | u(1) |
| if( subpic_treated_as_pic_flag[i] ) { | |
| subpic_ref_wraparound_enabled_flag[ i ] | u(1) |
| if( subpic_ref_wraparound_enabled_flag[i] ) | |
| subpic_ref_wraparound_offset_minus1[ i ] | |
| } | |
| loop_filter_across_subpic_enabled_flag[ i ] | u(1) |
| } | |
| ... | |

FIG. 10

| | Descriptor |
|---|---|
| seq_parameter_set_rbsp( ) { | |
| ... | |
| sps_ref_wraparound_enabled_flag | u(1) |
| if( sps_ref_wraparound_enabled_flag ) | |
| sps_ref_wraparound_offset_minus1 | ue(v) |
| subpics_present_flag | u(1) |
| if( subpics_present_flag ) { | |
| max_subpics_minus1 | u(8) |
| subpic_grid_col_width_minus1 | u(v) |
| subpic_grid_row_height_minus1 | u(v) |
| for( i = 0; i < NumSubPicGridRows; i++ ) | |
| for( i = 0; i < NumSubPicGridCols; i++ ) | |
| subpic_grid_idx[ i ][ i ] | u(v) |
| all_sub_pic_treated_as_pic_flag | u(1) |
| if( all_sub_pic_treated_as_pic_flag ) { | |
| all_subpic_ref_wraparound_enabled_flag | u(1) |
| if( all_subpic_ref_wraparound_enabled_flag ) { | |
| all_subpic_ref_wraparound_offset_minus1[ i ] | ue(v) |
| } | |
| for( i = 0; i <= NumSubPics; i++ ) { | |
| if( !all_sub_pic_treated_as_pic_flag ) { | |
| subpic_treated_as_pic_flag[ i ] | u(1) |
| if( subpic_treated_as_pic_flag[ i ] ) { | |
| subpic_ref_wraparound_enabled_flag[ i ] | u(1) |
| if( subpic_ref_wraparound_enabled_flag[ i ] ) | |
| subpic_ref_wraparound_offset_minus1[ i ] | ue(v) |
| } | |
| ... | |
| loop_filter_across_subpic_enabled_flag[ i ] | u(1) |
| } | |
| ... | |

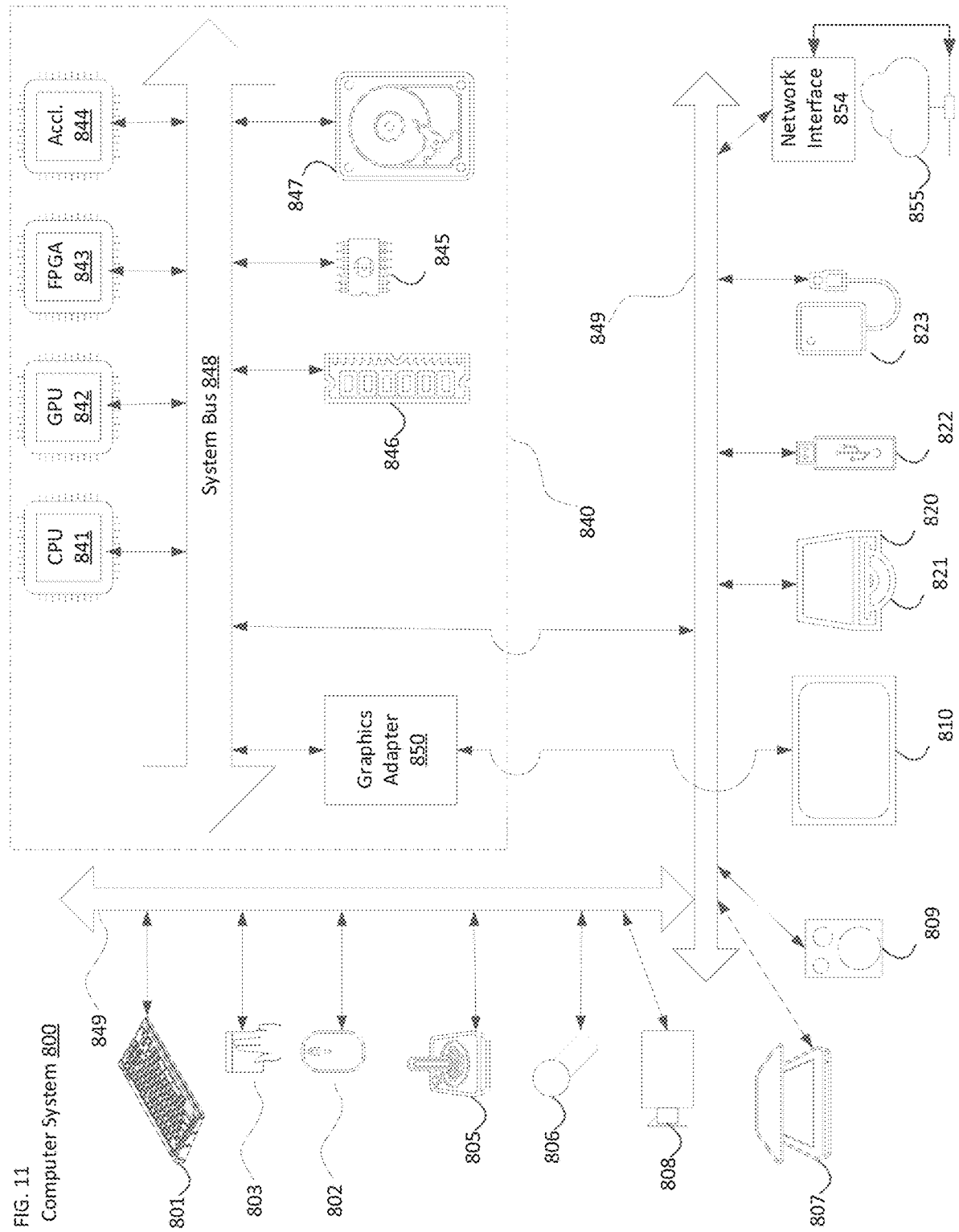

METHOD FOR PADDING PROCESSING WITH SUB-REGION PARTITIONS IN VIDEO STREAM

CROSS-REFERENCE TO RELATED APPLICATION

This application is a Continuation Application of U.S. application Ser. No. 17/019,692, filed on Sep. 14, 2020, which claims priority from U.S. Provisional Patent Application No. 62/903,635, filed on Sep. 20, 2019, in the U.S. Patent and Trademark Office, which is incorporated herein by reference in its entirety.

FIELD

This disclosure relates generally to field of data processing, and more particularly to video encoding and decoding.

BACKGROUND

Video coding and decoding using inter-picture prediction with motion compensation has been known for decades. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be introduced below.

The concept of dividing a coded video bitstream into packets for transportation over packet networks has been in use for decades. Early on, video coding standards and technologies were in their majority optimized for bot-oriented transport, and defined bitstreams. Packetization occurred in system layer interfaces specified, for example, in Real-time Transport Protocol (RTP) payload formats. With the advent of Internet connectivity suitable for mass-use of video over the Internet, the video coding standards reflected that prominent use case through the conceptual differentiation of a video coding layer (VCL) and a network abstraction layer (NAL). NAL units were introduced in H.264 in 2003, and have been retained in certain video coding standards and technologies since then with only slight modifications.

A NAL unit can, in many cases, be seen as the smallest entity on which a decoder can act upon without necessarily having decoded all preceding NAL units of a coded video sequence. Insofar, NAL units enable certain error resilience technologies as well as certain bitstream manipulation techniques, to include bitstream pruning, by Media Aware Network Elements (MANEs) such as Selective Forwarding Units (SFUs) or Multipoint Control Units (MCUs).

FIG. 1 depicts relevant parts of the syntax diagram of NAL unit headers in accordance with H.264 (101) and H.265 (102), in both cases without any of their respective extensions. In both cases, the forbidden_zero_bit is a zero bit used for start code emulation prevention in certain system layer environments. The nal_unit_type syntax element refers to the type of data a NAL unit carries, which can be, for example, one of certain slice types, parameter set types, Supplementary Enhancement Information (SEI) message, and so on. The H.265 NAL unit header further comprises nuh_layer_id and nuh_temporal_id_plus1, which indicate the spatial/SNR and temporal layer of a coded picture to which the NAL unit belongs.

It can be observed that the NAL unit header includes only easily parseable fixed length codewords, that do not have any parsing dependency to other data in the bitstream such as, for example, other NAL unit headers, parameter sets, and so on. As NAL unit headers are the first octets in a NAL unit, MANEs can easily extract them, parse them, and act on them. Other high level syntax elements, for example slice or tile headers, in contrast, are less easily accessible to MANEs as they may require keeping parameter set context and/or the processing of variable length or arithmetically coded codepoints.

It can further be observed that the NAL unit headers as shown in FIG. 1 do not include information that can associate a NAL unit to a coded picture that is composed of a plurality of NAL units (such as, for example, comprising multiple tiles or slices, at least some of which being packetized in individual NAL units).

Certain transport technologies such as RTP (RFC 3550), MPEG-system standards, ISO file formats, and so on, may include certain information, often in the form of timing information such as presentation time (in case of MPEG and ISO file format) or capture time (in case of RTP) that can be easily accessible by MANEs and can help associating their respective transport units with coded pictures. However, the semantics of these information can differ from one transport/storage technology to another, and may have no direct relationship with the picture structure used in the video coding. Accordingly, these information may be, at best, heuristics and may also not be particularly well suited to identify whether or not NAL units in a NAL unit stream belong to the same coded picture

SUMMARY

Embodiments relate to a method, system, and computer readable medium for video coding. According to one aspect, a method for video coding is provided. The method may include decoding coded syntax elements corresponding to wrap-around padding process. At least one coded current picture is reconstructed using wrap-around padding process.

The syntax elements indicate an offset value for wrap-around processing; or left and right padding width information.

According to another aspect, a computer system for video coding is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include decoding coded syntax elements corresponding to wrap-around padding process. At least one coded current picture is reconstructed using wrap-around padding process. The syntax elements indicate an offset value for wrap-around processing; or left and right padding width information.

According to yet another aspect, a computer readable medium for video coding is provided. The computer readable medium may include one or more computer-readable storage devices and program instructions stored on at least one of the one or more tangible storage devices, the program instructions executable by a processor. The program instructions are executable by a processor for performing a method that may accordingly include decoding coded syntax elements corresponding to wrap-around padding process. At least one coded current picture is reconstructed using wrap-around padding process. The syntax elements indicate an offset value for wrap-around processing; or left and right padding width information.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings:

FIG. 1 is a schematic illustration of NAL Unit Headers in accordance with H.264 and H.265;

FIG. 6 is a schematic illustration of syntax elements for offset signaling in accordance with an embodiment;

FIG. 7 is a schematic illustration of syntax elements for padding width signaling of an encoder in accordance with an embodiment;

FIG. 8 is a schematic illustration of a simplified block diagram of padding processing of each sub-region (tile or sub-picture) in accordance with an embodiment;

FIG. 9 is a schematic illustration of syntax elements for padding offset signaling of each sub-picture in accordance with an embodiment;

FIG. 10 is a schematic illustration of syntax elements for unified padding offset signaling of each sub-picture in accordance with an embodiment; and FIG. 11 is a schematic illustration of a computer system in accordance with an embodiment.

DETAILED DESCRIPTION

Figure 2:
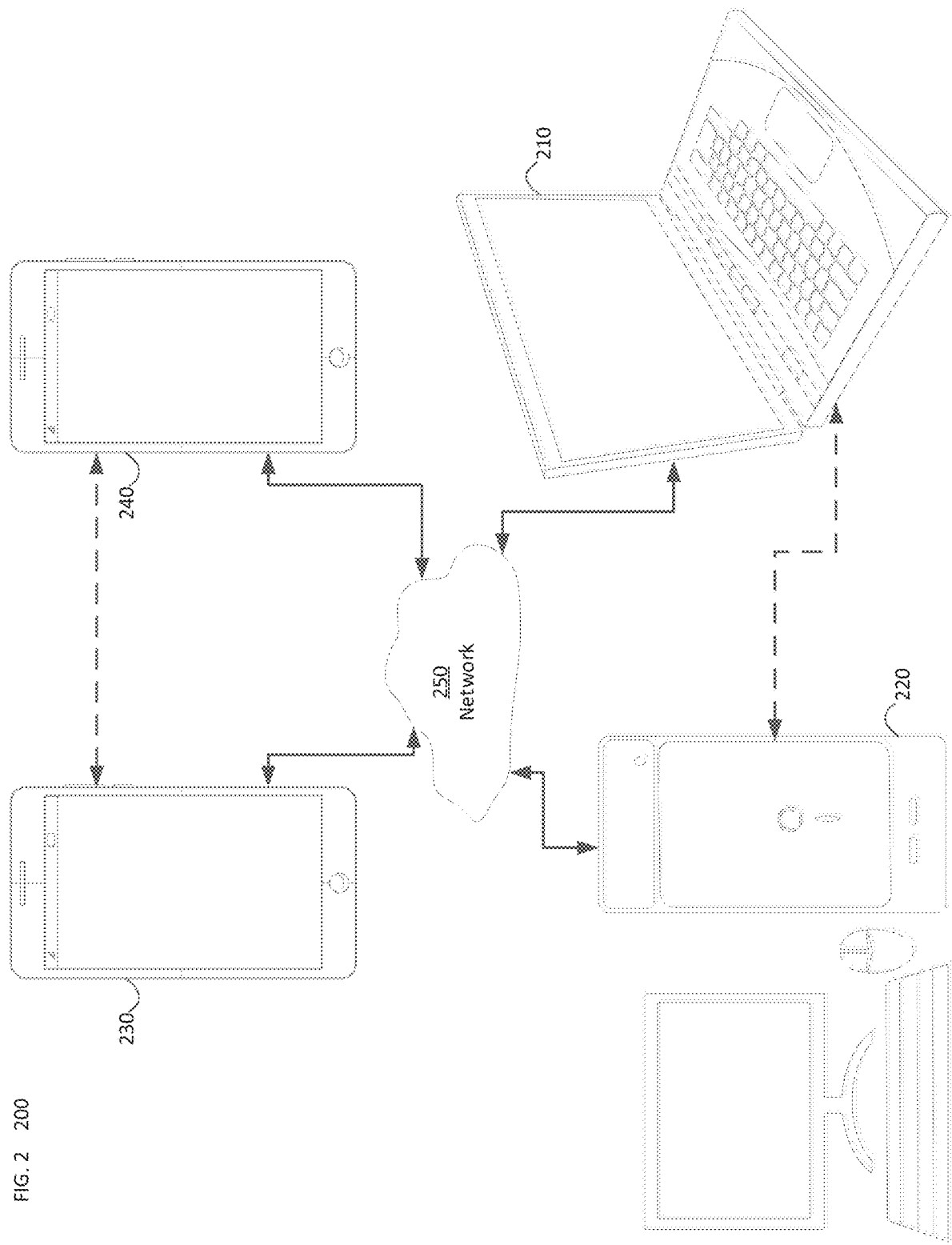
FIG. 2 is a schematic illustration of a simplified block diagram of a communication system in accordance with an embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to video encoding and decoding. The following described exemplary embodiments provide a system, method and computer program to, among other things, reconstruct a coded current picture using a wrap-around padding process based on decoding coded syntax elements. Therefore, some embodiments have the capacity to improve the field of computing by allowing for coding of syntax elements to be used in the reconstruction of a compressed image.

As previously described, one purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios. However, when a picture is partitioned into one or more sub-regions (tile, slice or sub-picture), boundary processing of each sub-region may affect the coding efficiency and the subjective visual quality. Adaptive control of boundary processing at each sub-region boundary is a key factor in 360 media processing. It may be advantageous, therefore, to reconstruct a coded current picture using a wrap-around padding process based on decoding coded syntax elements.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

The following described exemplary embodiments provide a system, method and computer program that reconstructs a coded current picture using a wrap-around padding process based on decoding coded syntax elements.

FIG. 2 illustrates a simplified block diagram of a communication system (200) according to an embodiment of the present disclosure. The system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
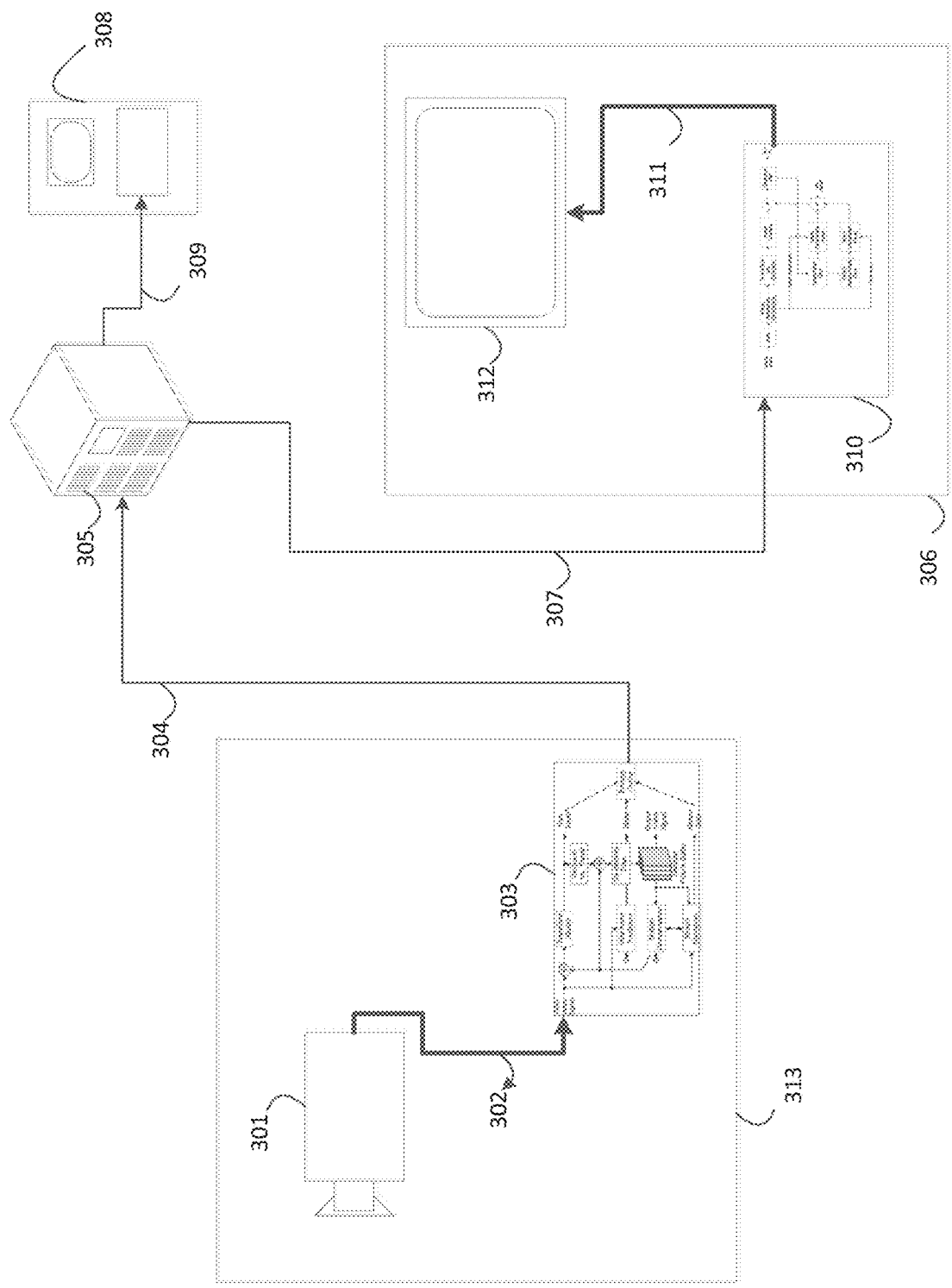
FIG. 3 is a schematic illustration of a simplified block diagram of a communication system in accordance with an embodiment.

FIG. 3 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating a for example uncompressed video sample stream (302). That sample stream (302), depicted as a bold line to emphasize a high data volume when compared to encoded video bitstreams, can be processed by an encoder (303) coupled to the camera (301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310) which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as Versatile Video Coding or VVC. The disclosed subject matter may be used in the context of VVC.

Figure 4:
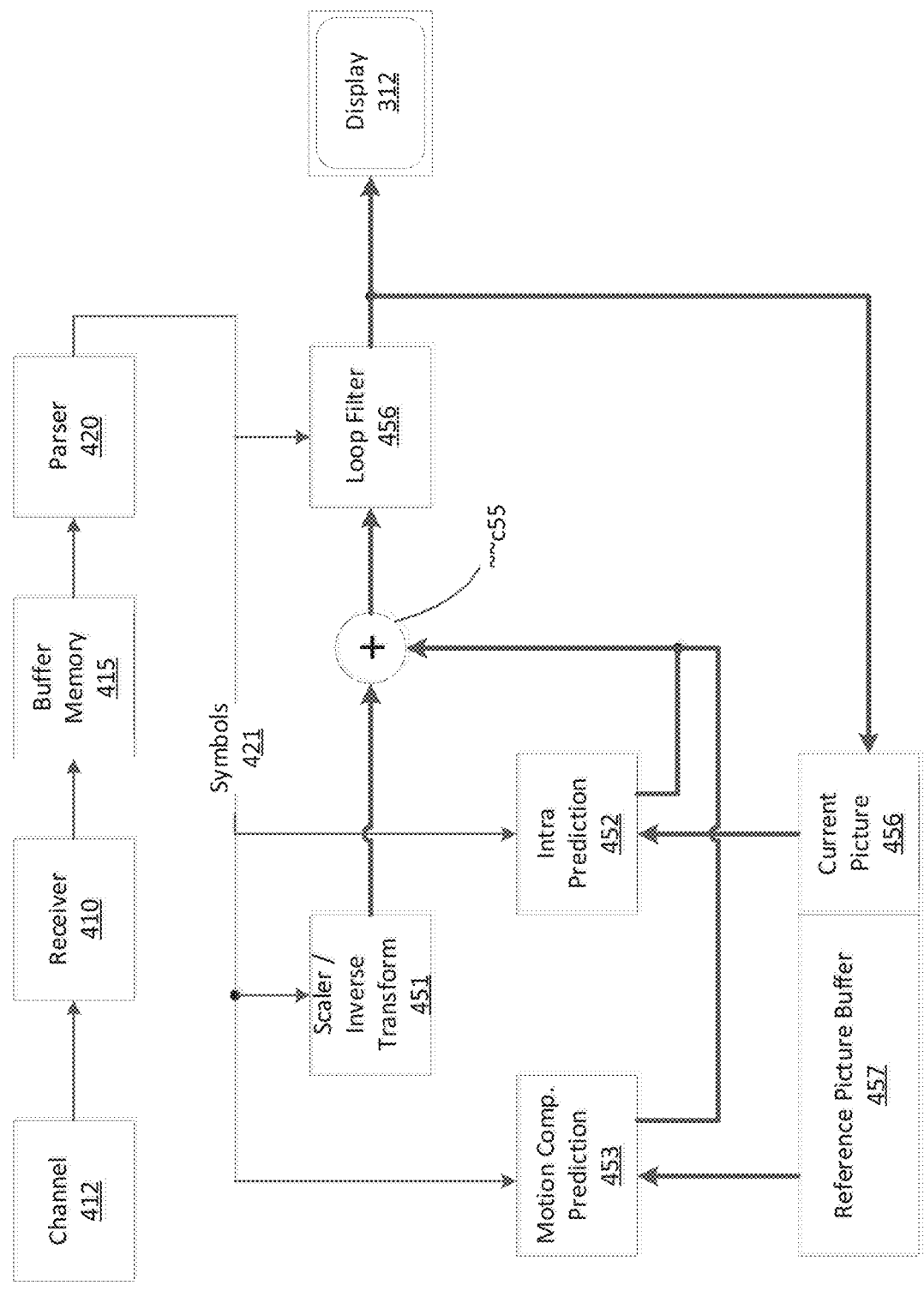
FIG. 4 is a schematic illustration of a simplified block diagram of a decoder in accordance with an embodiment.

FIG. 4 may be a functional block diagram of a video decoder (310) according to an embodiment of the present disclosure.

A receiver (410) may receive one or more codec video sequences to be decoded by the decoder (310); in the same or another embodiment, one coded video sequence at a time, where the decoding of each coded video sequence is independent from other coded video sequences. The coded video sequence may be received from a channel (412), which may be a hardware/software link to a storage device which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosychronous network, the buffer (415) may not be needed, or can be small. For use on best effort packet networks such as the Internet, the buffer (415) may be required, can be comparatively large and can advantageously of adaptive size.

The video decoder (310) may include an parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 3. The control information for the rendering device(s) may be in the form of Supplementary Enhancement Information (SEI messages) or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser (420) may perform entropy decoding/parsing operation on the video sequence received from the buffer (415), so to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder 310 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (421) from the parser (420). It can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (456). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video bitstream and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (312) as well as stored in the reference picture memory (456) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (456) can become part of the reference picture buffer (457), and a fresh current picture memory can be reallocated before commencing the reconstruction of the following coded picture.

The video decoder 420 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (410) may receive additional (redundant) data with the encoded video. The additional data may be included as part of the coded video sequence(s). The additional data may be used by the video decoder (420) to properly decode the data and/or to more accurately reconstruct the original video data. Additional data can be in the form of, for example, temporal, spatial, or SNR enhancement layers, redundant slices, redundant pictures, forward error correction codes, and so on.

Figure 5:
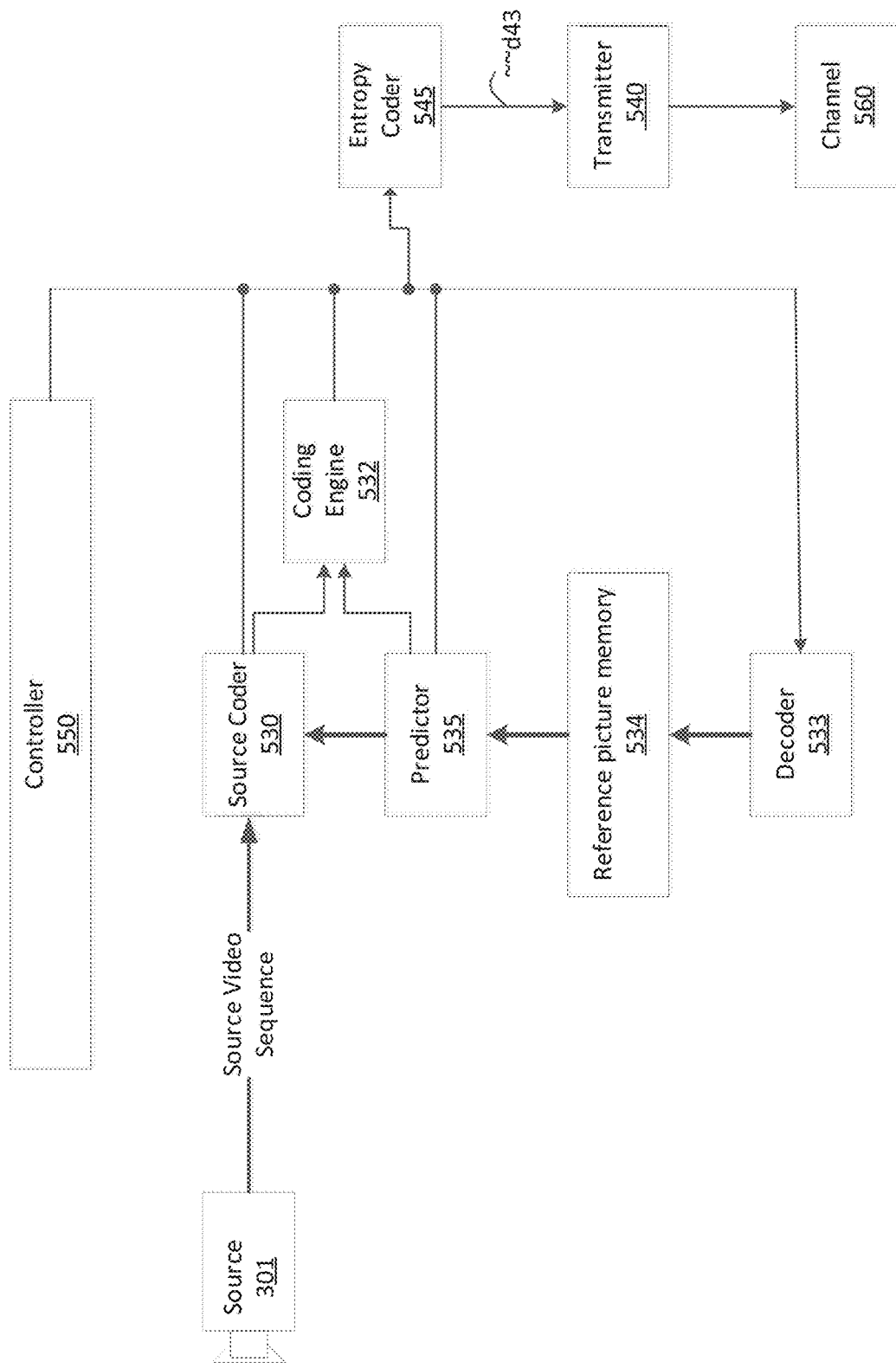
FIG. 5 is a schematic illustration of a simplified block diagram of an encoder in accordance with an embodiment.

FIG. 5 may be a functional block diagram of a video encoder (303) according to an embodiment of the present disclosure.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (303) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (303) may code and compress the pictures of the source video sequence into a coded video sequence (543) in real time or under any other time constraints as required by the application. Enforcing appropriate coding speed is one function of Controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the are readily recognizes as a "coding loop". As an oversimplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 4, however, as symbols are available and en/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focusses on decoder operation. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device which would store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block.

Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The video coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

In an embodiment, 360 video is captured by a set of cameras or a camera device with multiple lenses. The cameras typically cover omni-directions around the centre point of the camera set. The images of the same time instance are stitched, possibly rotated, projected, and mapped onto a picture. The packed pictures are encoded as coded to a coded video bitstream, and streamed, according to a particular media container file format. The file includes metadata such as projection and packing information.

In an embodiment, 360 video may be projected to 2D video, using equirectangular projection (ERP). The ERP projection may result in seam artifacts. The padded ERP (PERP) format may effectively reduce the seam artifacts in reconstructed viewports that encompass the left and right boundaries of the ERP picture. However, padding and blending may not be sufficient to completely resolve the seam issue.

In an embodiment, a horizontal geometry padding may be applied for ERP or PERP to reduce seam artifact. The padding process for PERP may be the same as for ERP, with the exception that the offset may be based on the unpadded ERP width instead of the picture width to account for the size of the padded regions. If a reference block is outside the left (right) reference picture boundary, it may be replaced with the "wrapped-around" reference block shifted to the right (left) by the ERP width. The traditional repetitive padding may be employed in the vertical direction. The blending of the left and right padded regions is kept out of loop, as a post-processing operation.

In an embodiment, a syntax to enable horizontal geometry padding of reference pictures for the ERP and PERP formats is shown in FIG. 6.

sps_ref_wraparound_enabled_flag (602) equal to 1 specifies that horizontal wrap-around motion compensation is used for inter prediction. sps_ref_wraparound_enabled_flag equal to 0 specifies that this motion compensation method is not applied.

ref_wraparound_offset (603) specifies the offset in luma samples used for computing the horizontal wrap-around position. ref_wraparound_offset shall be greater than pic_width_in_luma_samples−1, shall not be greater than pic_width_in_luma_samples, and shall be an integer multiple of MinCbSizeY.

In an embodiment, syntax elements to enable horizontal geometry padding of reference pictures for the ERP and PERP formats are shown in FIG. 7.

sps_ref_wraparound_enabled_flag (702) equal to 1 specifies that horizontal wrap-around motion compensation is used for inter prediction. sps_ref_wraparound_enabled_flag equal to 0 specifies that this motion compensation method is not applied.

left_wraparound_padding_width (703) specifies the width of left-side padding region in luma samples. ref_wraparound_offset shall be larger than or equal to 0, shall not be larger_than_pie_width_in_luma_samples/2, and shall be an integer multiple of MinCbSizeY.

right_wraparound_padding_width (704) specifies the width of right-side padding region in luma samples. ref_wraparound_offset shall be larger than or equal to 0, shall not be larger_than_pie_width_in_luma_samples/2, and shall be an integer multiple of MinCbSizeY.

Referring now to FIG. 8, an operational flowchart illustrating the steps of a method 900 for encoding video data is depicted.

At 901, the method 900 includes parsing a parameter set.

At 902, the method 900 includes decoding picture partitioning information.

At 903, the method 900 includes determining whether padding is applied to the boundaries of sub-regions.

At 904, the method 900 includes parsing the padding type if padding is applied to the boundaries of sub-regions.

At 905, the method 900 includes decoding each sub-region without padding if padding is not applied to the boundaries of sub-regions.

At 906, the method 900 includes determining whether wrap-around padding is applied.

At 907, the method 900 includes padding the boundaries of sub-regions with wrap-around padding if wrap-around padding is applied.

At 908, the method 900 includes padding the boundaries of sub-regions with non-wrap-around padding if wrap-around padding is not applied.

In an embodiment, the wrap-around offset value may be obtained by the following derivation process:

--- if ref_wraparound_offset is present
    wrapAroundOffset = ref_wraparound_offset
else if left_wraparound_padding_width and
right_wraparound_padding_width are present
    wrapAroundOffset = pic_width_in_luma_samples −
( left_wraparound_padding_width +
right_wraparound_padding_width )
    else
        wrapAroundOffset = pic_width_in_luma_samples

---

In an embodiment, to enable horizontal geometry padding of reference pictures for the ERP and PERP formats, the luma and chroma sample interpolation processes may be modified.

$$Clip3(x, y, z) = \begin{cases} x; & z < x \\ y; & z > y \\ z; & \text{otherwise} \end{cases}$$

$$ClipH(o, W, x) = \begin{cases} (o - (-x) \% o) \% o; & x < 0 \\ (x - W) \% o + W - o & x > P - 1 \\ x & \text{otherwise} \end{cases}$$

Luma sample interpolation process. Inputs to this process may include a luma location in full-sample units (xInt$_L$, yInt$_L$), a luma location in fractional-sample units (xFrac$_L$, yFrac$_L$), and the luma reference sample array refPicLX$_L$. Outputs of this process may include a predicted luma sample value predSampleLX$_L$.

The variables shift1, shift2 and shift3 are derived as follows. The variable shift1 is set equal to Min(4, BitDepth$_Y$−8), the variable shift2 is set equal to 6 and the variable shift3 is set equal to Max(2, 14−BitDepth$_Y$). The variable picW is set equal to pic_width_in_luma_samples and the variable picH is set equal to pic height in luma samples. The variable xOffset is set equal to wrapAroundOffset. The luma interpolation filter coefficients f$_L$[p] for each 1/16 fractional sample position p equal to xFrac$_L$ or yFrac$_L$ may be specified.

The predicted luma sample value predSampleLX$_L$ is derived as follows. If both xFrac$_L$ and yFrac$_L$ are equal to 0, the following applies. If sps_ref_wraparound_enabled_flag is equal to 0, the value of predSampleLX$_L$ is derived as predSampleLX$_L$=refPicLX$_L$[Clip3(0, picW−1, xInt$_L$)][Clip3(0, picH−1, yInt$_L$)]<<shift3. Otherwise, the value of predSampleLX$_L$ is derived as: predSampleLX$_L$=refPicLX$_L$[ClipH(xOffset, picW, xInt$_L$)][Clip3(0, picH−1, yInt$_L$)]<<shift3. Otherwise if xFrac$_L$ is not equal to 0 and yFrac$_L$ is equal to 0, the following applies. The value of yPos$_L$ is derived as yPos$_L$=Clip3(0, picH−1, yInt$_L$).

If sps_ref_wraparound_enabled_flag is equal to 0, the value of predSampleLX$_L$ is derived as follows:

predSampleLX$_L$=(f$_L$[xFrac$_L$][0]*refPicLX$_L$[Clip3(0, picW−1,xInt$_L$−3)][yPos$_L$]+f$_L$[xFrac$_L$][1]*refPicLX$_L$[Clip3(0,picW−1,xInt$_L$−2)][yPos$_L$]+f$_L$[xFrac$_L$][2]*refPicLX$_L$[Clip3(0,picW−1,xInt$_L$−1)][yPos$_L$]+f$_L$[xFrac$_L$][3]*refPicLX$_L$[Clip3(0,picW−1,xInt$_L$)][yPos$_L$]+f$_L$[xFrac$_L$][4]*refPicLX$_L$[Clip3(0,picW−1,xInt$_L$+1)][yPos$_L$]+f$_L$[xFrac$_L$][5]*refPicLX$_L$[Clip3(0,picW−1,xInt$_L$+2)][yPos$_L$]+f$_L$[xFrac$_L$][6]*refPicLX$_L$[Clip3(0,picW−1,xInt$_L$+3)][yPos$_L$]+f$_L$[xFrac$_L$][7]*refPicLX$_L$[Clip3(0,picW−1,xInt$_L$+4)][yPos$_L$])>>shift1

Otherwise, the value of predSampleLX$_L$ is derived as follows:

predSampleLX$_L$=(f$_L$[xFrac$_L$][0]*refPicLX$_L$[ClipH(xOffset,picW,xInt$_L$−3)][yPos$_L$]+f$_L$[xFrac$_L$][1]*refPicLX$_L$[ClipH(xOffset,picW,xInt$_L$−2)][yPos$_L$]+f$_L$[xFrac$_L$][2]*refPicLX$_L$[ClipH(xOffset,picW,xInt$_L$−1)][yPos$_L$]+f$_L$[xFrac$_L$][3]*refPicLX$_L$[ClipH(xOffset,picW,xInt$_L$)][yPos$_L$]+f$_L$[xFrac$_L$][4]*refPicLX$_L$[ClipH(xOffset,picW,xInt$_L$+1)][yPos$_L$]+f$_L$[xFrac$_L$][5]*refPicLX$_L$[ClipH(xOffset,picW,xInt$_L$+2)][yPos$_L$]+f$_L$[xFrac$_L$][6]*refPicLX$_L$[ClipH(xOffset,picW,xInt$_L$+3)][yPos$_L$]+f$_L$[xFrac$_L$][7]*refPicLX$_L$[ClipH(xOffset,picW,xInt$_L$+4)][yPos$_L$])>>shift.

Otherwise if xFrac$_L$ is equal to 0 and yFrac$_L$ is not equal to 0, the value of predSampleLX$_L$ is derived as follows. If sps_ref_wraparound_enabled_flag is equal to 0, the value of xPos$_L$ is derived as xPos$_L$=Clip3(0, picW−1, xInt$_L$). Otherwise, the value of xPos$_L$ is derived as: xPos$_L$=ClipH(xOffset, picW, xInt$_L$).

The predicted luma sample value predSampleLX$_L$ is derived as follows:

predSampleLX$_L$=(f$_L$[yFrac$_L$][0]*refPicLX$_L$[xPos$_L$][Clip3(0,picH−1,yInt$_L$−3)]+f$_L$[yFrac$_L$][1]*refPicLX$_L$[xPos$_L$][Clip3(0,picH−1,yInt$_L$−2)]+f$_L$[yFrac$_L$][2]*refPicLX$_L$[xPos$_L$][Clip3(0,picH−1,yInt$_L$−1)]+f$_L$[yFrac$_L$][3]*refPicLX$_L$[xPos$_L$][Clip3(0,picH−1,yInt$_L$)]+f$_L$[yFrac$_L$][4]*refPicLX$_L$[xPos$_L$][Clip3(0,picH−1,yInt$_L$+1)]+f$_L$[yFrac$_L$][5]*refPicLX$_L$[xPos$_L$][Clip3(0,picH−1,yInt$_L$+2)]+f$_L$[yFrac$_L$][6]*refPicLX$_L$[xPos$_L$][Clip3(0,picH−1,yInt$_L$+3)]+f$_L$[yFrac$_L$][7]*refPicLX$_L$[xPos$_L$][Clip3(0,picH−1,yInt$_L$+4)])>>shift1.

Otherwise if xFrac$_L$ is not equal to 0 and yFrac$_L$ is not equal to 0, the value of predSampleLX$_L$ is derived as follows. If sps_ref_wraparound_enabled_flag is equal to 0, the sample array temp[n] with n=0 . . . 7, is derived as follows:

yPos$_L$=Clip3(0,picH−1,yInt$_L$+n−3)

temp[n]=(f$_L$[xFrac$_L$][0]*refPicLX$_L$[Clip3(0,picW−1,xInt$_L$−3)][yPos$_L$]+f$_L$[xFrac$_L$][1]*refPicLX$_L$[Clip3(0,picW−1,xInt$_L$−2)][yPos$_L$]+f$_L$[xFrac$_L$][2]*refPicLX$_L$[Clip3(0,picW−1,xInt$_L$−1)][yPos$_L$]+f$_L$[xFrac$_L$][3]*refPicLX$_L$[Clip3(0,picW−1,xInt$_L$)][yPos$_L$]+f$_L$[xFrac$_L$][4]*refPicLX$_L$[Clip3(0,picW−1,xInt$_L$+1)][yPos$_L$]+f$_L$[xFrac$_L$][5]*refPicLX$_L$[Clip3(0,picW−1,xInt$_L$+2)][yPos$_L$]+f$_L$[xFrac$_L$][6]*refPicLX$_L$[Clip3(0,picW−1,xInt$_L$+3)][yPos$_L$]+f$_L$[xFrac$_L$][7]*refPicLX$_L$[Clip3(0,picW−1,xInt$_L$+4)][yPos$_L$])>>shift1.

Otherwise, the sample array temp[n] with n=0 . . . 7, is derived as follows:

yPos$_L$=Clip3(0,picH−1,yInt$_L$+n−3)

temp[n]=(f$_L$[xFrac$_L$][0]*refPicLX$_L$[ClipH(xOffset,picW,xInt$_L$−3)][yPos$_L$]+f$_L$[xFrac$_L$][1]*refPicLX$_L$[ClipH(xOffset,picW,xInt$_L$−2)][yPos$_L$]+f$_L$[xFrac$_L$][2]*refPicLX$_L$[ClipH(xOffset,picW,xInt$_L$−1)][yPos$_L$]+f$_L$[xFrac$_L$][3]*refPicLX$_L$[ClipH(xOffset,picW,xInt$_L$)][yPos$_L$]+f$_L$[xFrac$_L$][4]*refPicLX$_L$[ClipH(xOffset,picW,xInt$_L$+1)][yPos$_L$]+f$_L$[xFrac$_L$][5]*refPicLX$_L$[ClipH(xOffset,picW,xInt$_L$+2)][yPos$_L$]+f$_L$[xFrac$_L$][6]*refPicLX$_L$[ClipH(xOffset,picW,xInt$_L$+3)][yPos$_L$]+f$_L$[xFrac$_L$][7]*refPicLX$_L$[ClipH(xOffset,picW,xInt$_L$+4)][yPos$_L$])>>shift1.

The predicted luma sample value predSampleLX$_L$ is derived as follows:

predSampleLX$_L$=(f$_L$[yFrac$_L$][0]*temp[0]+f$_L$[yFrac$_L$][1]*temp[1]+f$_L$[yFrac$_L$][2]*temp[2]+f$_L$[yFrac$_L$][3]*temp[3]+f$_L$[yFrac$_L$][4]*temp[4]+f$_L$[yFrac$_L$][5]*temp[5]+f$_L$[yFrac$_L$][6]*temp[6]+f$_L$[yFrac$_L$][7]*temp[7])>>shift2.

Chroma sample interpolation process. Inputs to this process may include a chroma location in full-sample units (xInt$_C$, yInt$_C$), a chroma location in 1/32 fractional-sample units (xFrac$_C$, yFrac$_C$), and the chroma reference sample array refPicLX$_C$. Outputs of this process may include a predicted chroma sample value predSampleLX$_C$ The variables shift1, shift2 and shift3 are derived as follows. The variable shift1 is set equal to Min(4, BitDepth$_C$−8), the variable shift2 is set equal to 6 and the variable shift3 is set equal to Max(2, 14−BitDepth$_C$). The variable picW$_C$ is set equal to pic_width_in_luma_samples/SubWidthC and the variable picH$_C$ is set equal to pic height in luma samples/SubHeightC. The variable xOffset$_C$ is set equal to wrapAroundOffset/SubWidthC. The luma interpolation filter coefficients fc[p] for each 1/32 fractional sample position p equal to $xFrac_C$ or $yFrac_C$ may be specified.

The predicted chroma sample value predSampleLX$_C$ is derived as follows. If both $xFrac_C$ and $yFrac_C$ are equal to 0, the following applies. If sps_ref_wraparound_enabled_flag is equal to 0, the value of predSampleLX$_C$ is derived as:

predSample$LX_C$=refPic$LX_C$[Clip3(0,pic$W_C$–1,$xInt_C$)] [Clip3(0,pic$H_C$–1,$yInt_C$)]<<shift3.

Otherwise, the value of predSampleLX$_C$ is derived as predSample$LX_C$=refPic$LX_C$[ClipH($xOffset_C$, pic$W_C$, $xInt_C$)][Clip3(0, pic$H_C$–1, $yInt_C$)]<<shift3.

Otherwise if $xFrac_C$ is not equal to 0 and $yFrac_C$ is equal to 0, the following applies. The value of $yPos_C$ is derived as $yPos_C$=Clip3(0, pic$H_C$–1, $yInt_C$). If sps_ref_wraparound_enabled_flag is equal to 0, the value of predSampleLX$_C$ is derived as:

predSample$LX_C$=(fc[$xFrac_C$][0]*refPic$LX_C$[Clip3(0, pic$W_C$–1,$xInt_C$–1)][$yInt_C$]+fc[$xFrac_C$][1]*refPic$LX_C$[Clip3(0,pic$W_C$–1,$xInt_C$)][$yInt_C$]+fc[$xFrac_C$][2]*refPic$LX_C$[Clip3(0,pic$W_C$–1,$xInt_C$+1)][$yInt_C$]+fc[$xFrac_C$][3]*refPic$LX_C$[Clip3(0, pic$W_C$–1,$xInt_C$+2)][$yInt_C$])>>shift1.

Otherwise, the value of predSampleLX$_C$ is derived as:

predSample$LX_C$=(fc[$xFrac_C$][0]*refPic$LX_C$[ClipH($xOffset_C$,pic$W_C$,$xInt_C$–1)][$yPos_C$]+fc[$xFrac_C$][1]*refPic$LX_C$[ClipH($xOffset_C$,pic$W_C$,$xInt_C$)][$yPos_C$]+fc[$xFrac_C$][2]*refPic$LX_C$[ClipH($xOffset_C$,pic$W_C$,$xInt_C$+1)][$yPos_C$]+fc[$xFrac_C$][3]*refPic$LX_C$[ClipH($xOffset_C$,pic$W_C$,$xInt_C$+2)][$yPos_C$])>>shift1.

Otherwise if $xFrac_C$ is equal to 0 and $yFrac_C$ is not equal to 0, the value of predSampleLX$_C$ is derived as follows. If sps_ref_wraparound_enabled_flag is equal to 0, the value of $xPos_C$ is derived as: $xPos_C$=Clip3(0, pic$W_C$–1, $xInt_C$). Otherwise, the value of $xPos_C$ is derived as: $xPos_C$=ClipH($xOffset_C$, pic$W_C$, $xInt_C$)

The predicted chroma sample value predSampleLX$_C$ is derived as follows:

predSample$LX_C$=(fc[$yFrac_C$][0]*refPic$LX_C$[$xPos_C$][Clip3(0,pic$H_C$–1,$yInt_C$–1)]+fc[$yFrac_C$][1]*refPic$LX_C$[$xPos_C$][Clip3(0,pic$H_C$–1,$yInt_C$)]+fc[$yFrac_C$][2]*refPic$LX_C$[$xPos_C$][Clip3(0,pic$H_C$–1,$yInt_C$+1)]+fc[$yFrac_C$][3]*refPic$LX_C$[$xPos_C$][Clip3(0,pic$H_C$–1,$yInt_C$+2)])>>shift1.

Otherwise if $xFrac_C$ is not equal to 0 and $yFrac_C$ is not equal to 0, the value of predSampleLX$_C$ is derived as follows. If sps_ref_wraparound_enabled_flag is equal to 0, the sample array temp[n] with n=0 . . . 3, is derived as follows:

$yPos_C$=Clip3(0,pic$H_C$–1,$yInt_C$+n–1)

temp[n]=(fc[$xFrac_C$][0]*refPic$LX_C$[Clip3(0,pic$W_C$–1,$xInt_C$–1)][$yPos_C$]+fc[$xFrac_C$][1]*refPic$LX_C$[Clip3(0,pic$W_C$–1,$xInt_C$)][$yPos_C$]+fc[$xFrac_C$][2]*refPic$LX_C$[Clip3(0,pic$W_C$–1,$xInt_C$+1)][$yPos_C$]+fc[$xFrac_C$][3]*refPic$LX_C$[Clip3(0,pic$W_C$–1,$xInt_C$+2)][$yPos_C$])>>shift1.

Otherwise, the sample array temp[n] with n=0 . . . 3, is derived as follows:

$yPos_C$=Clip3(0,pic$H_C$–1,$yInt_C$+n–1)

temp[n]=(fc[$xFrac_C$][0]*refPic$LX_C$[ClipH($xOffset_C$,pic$W_C$,$xInt_C$–1)][$yPos_C$]+fc[$xFrac_C$][1]*refPic$LX_C$[ClipH($xOffset_C$,pic$W_C$,$xInt_C$)][$yPos_C$]+fc[$xFrac_C$][2]*refPic$LX_C$[ClipH($xOffset_C$,pic$W_C$,$xInt_C$+1)][$yPos_C$]+fc[$xFrac_C$][3]*refPic$LX_C$[ClipH($xOffset_C$,pic$W_C$,$xInt_C$+2)][$yPos_C$])>>shift1.

The predicted chroma sample value predSampleLX$_C$ is derived as follows:

predSample$LX_C$=(fc[$yFrac_C$][0]*temp[0]+fc[$yFrac_C$][1]*temp[1]+fc[$yFrac_C$][2]*temp[2]+fc[$yFrac_C$][3]*temp[3])>>shift2.

In an embodiment, if sps_ref_wraparound_enabled_flag is equal to 0 or is not present, a traditional repetitive padding may be applied. Otherwise, the wrap-around padding may be applied.

In an embodiment, the wrap-around padding may be applied at both horizontal and vertical boundaries. A flag in a high level syntax structure may indicate the wrap-around padding is applied in both horizontal and vertical.

In an embodiment, the wrap-around padding may be applied at tile or tile group boundaries. A flag in a high level syntax structure may indicate the wrap-around padding is applied in both horizontal and vertical.

In an embodiment, the reference picture may be identical to the current picture for motion compensated prediction. The wrap-around padding may be applied at the boundary of the current picture, when the current picture is the reference.

In an embodiment, when a picture is partitioned into one or more sub-picture, which is a rectangular region of one or more slices, the boundary of each sub-picture may or may not be handled as a picture boundary. Treating a sub-picture as a picture indicates that the boundary of each sub-picture may be padded for motion compensated prediction.

Referring to FIG. 9, in SPS (or any other parameter set), subpic_treated_aspic_flag[i] equal to 1 specifies that the i-th subpicture of each coded picture in the CVS is treated as a picture in the decoding process. subpic_treated_aspic_flag[i] equal to 0 specifies that the i-th subpicture of each coded picture in the CVS is not treated as a picture in the decoding process. When not present, the value of subpic_treated_as_pic_flag[i] is inferred to be equal to 0.

In the same embodiment, when subpic_treated_aspic_flag[i] is equal to 1, which indicates that the i-th sub-picture is treated as a picture, a flag subpic_ref_wraparound_enabled_flag[i] is signaled. subpic_ref_wraparound_enabled_flag[i] equal to 1. subpic_ref_wraparound_enabled_flag[i] equal to 1 specifies that horizontal wrap-around motion compensation is applied in inter prediction at the boundary of the i-th sub-picture of each coded picture. sps_ref_wraparound_enabled_flag[i] equal to 0 specifies that horizontal wrap-around motion compensation is not applied at the boundary of the i-th sub-picture of each coded picture.

In the same embodiment, subpic_ref_wraparound_offset_minus1[i] plus 1 specifies the offset of the i-th sub-picture of each coded picture, used for computing the horizontal wrap-around position in units of MinCbSizeY luma samples.

In the same embodiment, the interploation filtering process is as follows. Luma sample interpolation filtering process. Inputs to this process may include a luma location in full-sample units ($xInt_L$, $yInt_L$), a luma location in fractional-sample units ($xFrac_L$, $yFrac_L$), a luma location in full-sample units ($xSbInt_L$, $ySbInt_L$) specifying the top-left sample of the bounding block for reference sample padding relative to the top-left luma sample of the reference picture, the luma reference sample array refPic$LX_L$, the half sample interpolation filter index hpelIfIdx, a variable sbWidth specifying the width of the current subblock, a variable sbHeight specifying the height of the current subblock, and a luma location (xSb, ySb) specifying the top-left sample of the current subblock relative to the top-left luma sample of the current picture. Outputs of this process may include a predicted luma sample value predSampleLX$_L$ The variables shift1, shift2 and shift3 are derived as follows. The variable shift1 is set equal to Min(4, BitDepth$_Y$−8), the variable shift2 is set equal to 6 and the variable shift3 is set equal to Max(2, 14−BitDepth$_Y$). The variable picW is set equal to pic_width_in_luma_samples and the variable picH is set equal to pie height in luma samples.

The luma interpolation filter coefficients $f_L[p]$ for each 1/16 fractional sample position p equal to xFrac$_L$ or yFrac$_L$ are derived as follows. If MotionModelIdc[xSb][ySb] is greater than 0, and sbWidth and sbHeight are both equal to 4, the luma interpolation filter coefficients $f_L[p]$ may be specified. Otherwise, the luma interpolation filter coefficients $f_L[p]$ are specified in Table 8-11 depending on hpelIfIdx.

The luma locations in full-sample units (xInt$_i$, yInt$_i$) are derived as follows for i=0 . . . 7. If subpic_treated_aspic_flag[SubPicIdx] is equal to 1, the following applies:

$x$Int$_i$=Clip3(SubPicLeftBoundaryPos,SubPicRightBoundaryPos,subpic_ref_wraparound_enabled_flag[SubPicIdx]

Clip$H$((subpic_ref_wraparound_offset_minus1[SubPicIdx]+1)*MinCbSize$Y$,SubPicRight BoundaryPos,$x$Int$_L$+$i$−3): $x$Int$_L$+$i$−3).

$y$Int$_i$=Clip3(SubPicTopBoundaryPos,SubPicBotBoundaryPos,$y$Int$_L$+$i$−3).

Otherwise (subpic_treated_aspic_flag[SubPicIdx] is equal to 0), the following applies:

$x$Int$_i$=Clip3(0,pic$W$−1,sps_ref_wraparound_enabled_flag Clip$H$((sps_ref_wraparound_offset_minus1+1)*MinCbSize$Y$,pic$W$,$x$Int$_L$+$i$−3): $x$Int$_L$+$i$−3)

$y$Int$_i$=Clip3(0,pic$H$−1,$y$Int$_L$+$i$−3)

The luma locations in full-sample units are further modified as follows for i=0 . . . 7:

$x$Int$_i$=Clip3($x$SbInt$_L$−3,$x$SbInt$_L$+sbWidth+4,$x$Int$_i$)

$y$Int$_i$=Clip3($y$SbInt$_L$−3,$y$SbInt$_L$+sbHeight+4,$y$Int$_i$)

The predicted luma sample value predSampleLX$_L$ is derived as follows. If both xFrac$_L$ and yFrac$_L$ are equal to 0, the value of predSampleLX$_L$ is derived as:

predSample$LX_L$=refPic$LX_L$[$x$Int$_3$][$y$Int$_3$]<<shift3.

Otherwise, if xFrac$_L$ is not equal to 0 and yFrac$_L$ is equal to 0, the value of predSampleLX$_L$ is derived as predSampleLX$_L$=($\Sigma_{i=0}^{7}f_L$[xFrac$_L$][i]*refPicLX$_L$[xInt$_i$] [yInt$_3$])>>shift1.

Otherwise, if xFrac$_L$ is equal to 0 and yFrac$_L$ is not equal to 0, the value of predSampleLX$_L$ is derived as predSampleLX$_L$=($\Sigma_{i=0}^{7}f_L$[yFrac$_L$][i]*refPicLX$_L$[xInt$_3$][yInt$_i$])>>shift1.

Otherwise, if xFrac$_L$ is not equal to 0 and yFrac$_L$ is not equal to 0, the value of predSampleLX$_L$ is derived as follows:

The sample array temp[n] with n=0 . . . 7, is derived as: temp[n]=($\Sigma_{i=0}^{7}f_L$[xFrac$_L$][i]*refPicLX$_L$[xInt$_i$][yInt$_n$])>>shift1.

The predicted luma sample value predSampleLX$_L$ is derived as predSampleLX$_L$=($\Sigma_{i=0}^{7}f_L$[yFrac$_L$][i]*temp[i])>>shift2.

In the same or another embodiment, referring to FIG. 10, in SPS (or any other parameter set), all_subpic_treated_aspic_flag equal to 1 specifies that any sub-picture of each coded picture in the CVS is treated as a picture in the decoding process. subpic_treated_aspic_flag[i] equal to 0 specifies that any subpicture of each coded picture in the CVS is not treated as a picture in the decoding process.

In the same embodiment, when all_subpic_treated_aspic_flag[i] is equal to 1, a flag all_subpic_ref_wraparound_enabled_flag is signaled. all_subpic_ref_wraparound_enabled_ flag equal to 1 specifies that horizontal wrap-around motion compensation is applied in inter prediction at the boundary of any sub-picture of each coded picture. all sps_ref_wraparound_enabled_flag equal to 0 specifies that horizontal wrap-around motion compensation is not applied at the boundary of any sub-picture of each coded picture.

In the same embodiment, all_subpic_ref_wraparound_offset_minus1[i] plus 1 specifies the offset of any sub-picture of each coded picture, used for computing the horizontal wrap-around position in units of MinCbSizeY luma samples. In the same embodiment, when subpic_treated_aspic_flag[i] is not present, the value of subpic_treated_aspic_flag[i] is inferred to be equal to all_subpic_treated_aspic_flag.

In the same embodiment, when subpic_ref_wraparound_enabled_flag[i] is not present, the value of subpic_ref_wraparound_enabled_flag[i] is inferred to be equal to all_subpic_ref_wraparound_enabled_flag.

In the same embodiment, when subpic_ref_wraparound_offset_minus1[i] is note present, the value of subpic_ref_wraparound_offset_minus1[i] is inferred to be equal to all_subpic_ref_wraparound_offset_minus1.

The techniques for wrap-around padding process described above, can be implemented as computer software using computer-readable instructions and physically stored in one or more computer-readable media. For example, FIG. 11 shows a computer system 800 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 11 for computer system 800 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 800.

Computer system 800 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 801, mouse 802, trackpad 803, touch screen 810, data-glove 804, joystick 805, microphone 806, scanner 807, camera 808.

Computer system 800 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 810, data-glove 804, or joystick 805, but there can also be tactile feedback devices that do not serve as input devices), audio output devices (such as: speakers 809, headphones (not depicted)), visual output devices (such as screens 810 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 800 can also include human accessible storage devices and their associated media such as optical media including CD/DVD ROM/RW 820 with CD/DVD or the like media 821, thumb-drive 822, removable hard drive or solid state drive 823, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 800 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (849) (such as, for example USB ports of the computer system 800; others are commonly integrated into the core of the computer system 800 by attachment to a system bus as described below (for example Ethernet interface into a PC computer system or cellular network interface into a smartphone computer system). Using any of these networks, computer system 800 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 840 of the computer system 800.

The core 840 can include one or more Central Processing Units (CPU) 841, Graphics Processing Units (GPU) 842, specialized programmable processing units in the form of Field Programmable Gate Areas (FPGA) 843, hardware accelerators for certain tasks 844, and so forth. These devices, along with Read-only memory (ROM) 845, Random-access memory 846, internal mass storage such as internal non-user accessible hard drives, SSDs, and the like 847, may be connected through a system bus 848. In some computer systems, the system bus 848 can be accessible in the form of one or more physical plugs to enable extensions by additional CPUs, GPU, and the like. The peripheral devices can be attached either directly to the core's system bus 848, or through a peripheral bus 849. Architectures for a peripheral bus include PCI, USB, and the like.

CPUs 841, GPUs 842, FPGAs 843, and accelerators 844 can execute certain instructions that, in combination, can make up the aforementioned computer code. That computer code can be stored in ROM 845 or RAM 846. Transitional data can be also be stored in RAM 846, whereas permanent data can be stored for example, in the internal mass storage 847. Fast storage and retrieve to any of the memory devices can be enabled through the use of cache memory, that can be closely associated with one or more CPU 841, GPU 842, mass storage 847, ROM 845, RAM 846, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 800, and specifically the core 840 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 840 that are of non-transitory nature, such as core-internal mass storage 847 or ROM 845. The software implementing various embodiments of the present disclosure can be stored in such devices and executed by core 840. A computer-readable medium can include one or more memory devices or chips, according to particular needs. The software can cause the core 840 and specifically the processors therein (including CPU, GPU, FPGA, and the like) to execute particular processes or particular parts of particular processes described herein, including defining data structures stored in RAM 846 and modifying such data structures according to the processes defined by the software. In addition or as an alternative, the computer system can provide functionality as a result of logic hardwired or otherwise embodied in a circuit (for example: accelerator 844), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video encoding, executable by a processor, the method comprising:
   determining syntax elements corresponding to a wrap-around padding process based on shifting a reference block by a reference wrap-around padding width value, wherein the reference wrap-around padding width value is determined based on locations of luma samples in the reference block; and
   encoding at least one picture using the wrap-around padding process, wherein the wrap- around padding process is applied at boundaries of subpictures.

2. The method of claim 1, wherein the syntax elements indicate one of: an offset value for wrap-around processing, or left and right padding width information.

3. The method of claim 2, wherein a flag indicates whether the syntax elements corresponding to the wrap-around padding process are present in a parameter set.

4. The method of claim 3, wherein a pixel position for a motion compensated prediction in a reference picture is determined by interpreting the syntax elements corresponding to the wrap-around padding process with a clipping process.

5. The method of claim 4, wherein a fractional pixel is interpolated for the motion compensated prediction based on the determined pixel position.

6. The method of claim 5, wherein an overwrapped region is blended to remove a seam artifact as a post processing.

7. The method of claim 1, wherein the wrap-around padding process is applied at a tile or a tile group boundary.

8. The method of claim 1, wherein the at least one picture comprises a reference for motion compensation.

9. The method of claim 8, wherein the wrap-around padding process is applied at a boundary of the at least one picture.

10. The method of claim 1, wherein the wrap-around padding process is applied at a horizontal, a vertical boundary, or at both the vertical and horizontal boundaries.

11. The method of claim 10, wherein a flag in a high level syntax structure indicates whether the wrap-around padding process is applied at the horizontal, the vertical boundary or both the vertical and horizontal boundaries.

12. A computer system for video coding, the computer system comprising:
   one or more computer-readable non-transitory storage media configured to store program code; and
   one or more computer processors configured to access said program code and operate as instructed by said program code, said program code including:
      determining code configured to cause the one or more computer processors to determine syntax elements corresponding to a wrap-around padding process based on shifting a reference block by a reference wraparound padding width value, wherein the reference wrap-around padding width value is determined based on locations of luma samples in the reference block; and
      encoding code configured to cause the one or more computer processors to encode at least one picture using the wrap-around padding process, wherein the wrap-around padding process is applied at boundaries of subpictures.

13. The computer system of claim 12, wherein the syntax elements indicate one of: an offset value for wrap-around processing, or left and right padding width information.

14. The computer system of claim 13, wherein a flag indicates whether the syntax elements corresponding to the wrap-around padding process are present in a parameter set.

15. The computer system of claim 14, wherein a pixel position for a motion compensated prediction in a reference picture is determined by interpreting the syntax elements corresponding to the wrap-around padding process with a clipping process.

16. The computer system of claim 15, wherein a fractional pixel is interpolated for the motion compensated prediction based on the determined pixel position.

17. The computer system of claim 16, wherein an overwrapped region is blended to remove a seam artifact as a post processing.

18. The computer system of claim 12, wherein the wrap-around padding process is applied at a tile or a tile group boundary.

19. The computer system of claim 12, wherein the at least one picture is a reference for motion compensation.

20. A non-transitory computer readable medium having stored thereon a program for video coding, the program configured to cause one or more computer processors to:
   determine syntax elements corresponding to a wrap-around padding process based on shifting a reference block by a reference wrap-around padding width value, wherein the reference wrap-around padding width value is determined based on locations of luma samples in the reference block; and
   encode at least one picture using the wrap-around padding process, wherein the wrap- around padding process is applied at boundaries of subpictures.

* * * * *